United States Patent [19]

Salinas

[11] Patent Number: 5,467,640

[45] Date of Patent: Nov. 21, 1995

[54] PIPELINE TESTING AND LEAK LOCATING APPARATUS AND METHOD

[76] Inventor: Joe E. Salinas, P.O., Box 270654, Corpus Christi, Tex. 78427-0654

[21] Appl. No.: 235,916

[22] Filed: May 2, 1994

[51] Int. Cl.$^6$ .......................... G01N 03/28; G01N 25/72; F16L 55/00
[52] U.S. Cl. ................. 73/40.5 R; 73/49.1; 73/134.4
[58] Field of Search ................ 73/40.5 R, 49.1, 73/49.5; 254/134.3 R, 134.4, 134.3 FT

[56] References Cited

U.S. PATENT DOCUMENTS

| | | | |
|---|---|---|---|
| 3,554,493 | 1/1971 | Bowden et al. | 254/134.3 |
| 3,561,490 | 2/1971 | Little | 138/90 |
| 4,026,329 | 5/1977 | Thompson | 138/97 |
| 4,083,533 | 4/1978 | Schwabe | 254/134.4 |
| 4,582,297 | 4/1986 | Conti | 254/134.3 FT |
| 4,666,102 | 5/1987 | Colbaugh et al. | 242/86.5 R |
| 4,715,747 | 12/1987 | Behrens | 405/303 |
| 4,794,791 | 1/1989 | Wittrisch | 73/151 |
| 4,913,558 | 4/1990 | Wettervik et al. | 374/4 |
| 5,009,242 | 4/1991 | Prange | 134/113 |

FOREIGN PATENT DOCUMENTS

| | | | |
|---|---|---|---|
| 4114601 | 4/1992 | Germany | 73/49.1 |
| 4135153 | 4/1993 | Germany | 73/49.1 |
| 0184437 | 8/1986 | Japan | 73/49.1 |
| 9323729 | 11/1993 | WIPO | 73/49.1 |

Primary Examiner—Hezron E. Williams
Assistant Examiner—J. David Wiggins
Attorney, Agent, or Firm—Daniel Vera

[57] ABSTRACT

The invention constitutes an apparatus and method for inexpensively, testing sewer drainage pipes and other pipes for leaks especially where exterior inspection is impractical, which includes the use of an inflatable test ball, a remotely operated camera lens with lighting and viewing terminal, snaking assisting lanyards and a method of snaking and water or other test fluid, wherein segments of pipe are isolated by snaking the test ball and camera to a point in the pipe, inflating the test ball to seal a segment of the pipe, internally, and viewing the quality of the seal of the test ball with the camera lens by its being located on one side of the test ball opposite the side water is injected into the pipe segment being tested and viewing and comparing water stability on both sides of the test ball.

10 Claims, 9 Drawing Sheets

PIPELINE TESTING AND LEAK LOCATING APPARATUS AND METHOD

BACKGROUND OF THE INVENTION

1. Field of Invention

This invention relates to articles of manufacture and methods for testing pipelines for leaks: by testing and inspecting the interior of the pipeline.

2. Background Information

U.S. Pat. Nos. 4,677,472 issued to Wood on Jun. 30, 1987 for an apparatus for inspecting the interior of a pipeline; 5,018,545 issued to Wells on May 28, 1991 for an apparatus for cleaning the interior of a lateral pipeline, appear to the inventor and/or his patent agent or patent attorney to be relevant to this application.

DESCRIPTION OF THE PRIOR ART

Sewer drainage pipe and generally all pipe occasionally require repair due to the development of leaks either by damage to the pipeline wall or improper joint connection or simply because they rust or wear out. Often the pipeline is obstructed from view because it is buried underground or is underneath buildings or foundations or driveways or streets or inside of a building's wall. In these situations locating the leak by visual inspection of the exterior of the pipeline is difficult and if demolition or removal of any of the aforementioned obstructions is necessary, inspection can become quite expensive without assuring location of the leak and with the added risk of creating leaks by damaging the pipeline during the removal of an obstruction.

The detection of leaks in pipelines, especially sewer drainage pipelines is currently accomplished by either digging out the earth and removing the surrounding structures and visually inspecting the exterior integrity of the pipe or by visually inspecting the interior of the pipe with a remotely operated camera lens, which has its own lights for lighting housed with the camera lens, and sends its visual panorama to a viewing terminal (T.V. screen or video monitor) via a semi-rigid cable connecting the camera to the viewing terminal for viewing by an operator of the camera or by some other standby personnel.

Pipeline inspection cameras such as Model No. 10-1425 provided by RS Technical Services, Incorporated, can be used to inspect the interior of pipelines. They also provide a camera, and push cable which with the aid of a video monitor which they also supply, hereafter monitor, allows someone to push the camera through the inside and along the length of a pipeline and by viewing the monitor effect an inspection of the pipeline's interior via the remote location of the camera as it is pushed or tractored along the interior of a pipeline. The following parts are also supplied by RS Technical Services Inc. and for disclosure purposes are intended for usage as disclosed for purposes of this invention, they may hereafter be referred to as; camera, cable, reels, monitor, VCR, tractor system, winch or other names which are listed by RS Technical Services incorporated as the following parts numbers and names; 10-1038 Camera Power Supply with Transformer, 10-1400 and 10-1415 Red Eye System and Camera, 10-1210 and 10-1211 and 10-1201 and 10-1301 and 10-1310 and 10-1001 and 10-1425 Cameras, 11-1017 and 11-1019 and 11-1220 and 11-1211 and Push Cable with Reel, 11-1300 Fiberglass Push Rod with Reel, 11-1252 Power Econo Reel with Footage Counter, 31-1007 Push Cable Reel with Slip Rings, 31-1020 Counter, 10-1317 Skids, 32-1000 Tractor Transport Vehicle. These parts are enumerated and disclosed as samples of parts considered herein as disclosed for purposes of assisting in the description of the invention which encompasses these parts but is not limited to the listing of these parts.

Some hairline cracks and leaks are not visible to the camera or its operator viewing the monitor because of their hairline configuration and/or because of interior debris or corrosion or chemical or sludge build up on the inside wall of a pipeline obscuring the crack or leak being inspected and therefore rendering visual inspection alone, ineffective.

Inflatable test balls are also known in the art of pipeline testing and leak locating. For example a company known to inventor only as Cherne, provides a test ball, Part No. 270-032 for testing three inch nominal diameter pipes. The following test balls numbers are disclosed as samples of test balls considered herein but not intended as limiting the scope of this invention to these test balls, they are, Numbers: 270-016, 270-024, 270-032, 270-040, 270-059, 270-067, 275-441, 053-910, 056-103, 271-020, 271-039, 271-047, 271-055, 271-063, 271-098, 274-518, 274-526, and 274-534. Basically these test balls are generally smaller in diameter than the pipe into which they are inserted for testing purposes and they range in size from small enough to test one and one half inch nominal diameter pipe up to six inch nominal diameter pipe and are disclosed as part of this invention, however it is conceived that the size of pipe possible to test and inspect by the herein disclosed apparatus and method include both smaller and larger diameter pipes. The test balls are attached to a pneumatic or pneumatic/hydraulic hose which is used to push the test balls to a point in the pipe being tested and they are then inflated with compressed air or water via the attached pneumatic hose, so that they effect a blockage or seal in the pipeline. The pipeline can then be filled with water. The water level in the pipeline is watched to see whether said water level remains stable, and in this manner leaking pipelines can be detected. However defects in the pipeline inner wall or misplacement of the test ball at a "Y"or "T" juncture in the pipeline may interfere with the seal and tests with test balls alone may therefore be inaccurate or ineffective.

SUMMARY OF THE INVENTION

The principle object of the present invention is to provide a portable, pipeline leak-locating and integrity testing apparatus and method for testing pipe using the apparatus.

A further object of the invention is to provide a method for inexpensively and effectively locating pipeline leaks where the removal of surrounding earth or structures such as buildings may render visual inspection of the exterior of a pipeline impractical.

The device provides; of several features, one for positively being able to control the delivery and retrieval of inspection and testing apparatus transported within a pipeline. This is accomplished, on a pipeline having two ends, by controlling the camera or test equipment from one end of a pipeline by its actuating hose or cable and from the other end by a lanyard that is attached to the camera or test equipment. Thus the piece of equipment can be pushed and pulled from both ends of a pipeline being tested. This avoids buckling of cables and hoses within a pipeline and damage to equipment and the pipeline which may result therefrom.

Another feature is a method for calculating the location of leaks in a pipeline that is buried under earth or concrete or other obstructions to access. This is accomplished by calculating the distance the test equipment has traveled in to a pipeline being tested by the use of a mechanism which counts the length of cable or lanyard that has entered or exited the pipeline. These means are generally friction driven rollers which are driven by passing a cable or hose or any lanyard between two or more rollers and wherein said rollers are connected to gears or other means for counting the revolution of the rollers and thereby calculating the length of the hose, cable or lanyard that has passed through the rollers and provides an easily read numerical readout of hose, cable or lanyard remaining in the pipeline.

The present invention adds a refinement of the techniques used in transporting the camera through the pipeline and its various turns and branches (snaking technique) and combines with it a technique for pin-pointing the near exact location of leaks. This is accomplished through the use of an inflatable rubber test ball and the snaking technique and water and the remotely operated camera and a mechanism which measures the amount of cable or lanyard that has entered or exited the pipeline.

The snaking technique comprises blowing a hose, string or lanyard from a first service opening, of a drainage system to be checked for leaks, to any other or second service opening in the drainage system, which may be anything from a vent pipe on the roof of a single family house system to a manhole of a larger system to an opening made or cut into the sewer pipe at a convenient place by the servicing personnel. Once the hose or lanyard is blown through the pipe segment defined as being between the two service openings, it is attached to the camera lens which is attached to a semi-rigid cable and thus the camera can be pushed and/or pulled to any point between the lanyard supply opening and the camera cable supply opening. This snaking technique is also used for transporting the rubber test ball with its pneumatic or pneumatic/hydraulic service hose attached. In the case of vertical pipe drainage leaks; once the camera is in place, the test ball is transported down to an arbitrary point in the pipe, the camera is located beneath the test ball and is facing or aimed at the test ball and is used to check for the integrity of the test ball seal and to look for visible defects in the pipe, the test ball is inflated to seal the pipe and the pipe is then filled with water to full capacity from a high point in the system which is accessible to be viewed and filled with water. The water level, at the high point is viewed to either remain constant if no leaks are present in the pipe line above the location of the test ball or the water level will recede into the pipe if a leak is present. Thus a segment of pipe is tested for leaks. By relocating the test ball up or down the line and by checking for the adequacy of the test ball seal by the use of the camera, a leak's location can be precisely located through the aforementioned process of elimination of good pipe segments, and by the calculated use of the cable and lanyard measuring devices. In systems with branches and in horizontal pipeline segments more than one test ball and camera can, and sometimes must, be used to isolate a pipe segment. Still by having at least one high point where water levels can be viewed to either remain constant or recede or by using two test balls wherein the camera can be located between the test balls and the water level stability viewed from within the pipe segment defined between the two test balls by the monitor, most domestic systems may be inexpensively and thoroughly checked for leaks.

By the use of a test ball which has the capability of delivering fluids ahead of the ball and simultaneously sealing a pipe the aforementioned and described apparatus and method is made even more efficient and effective. This is because less water will be used to test pipeline segments and smaller segments of pipe can be tested with greater accuracy than when a singular test ball is used and may be at such a distance from the high point that the drainage system expansion and contraction may provide inconsistent or erroneous fluid stability levels when viewed at the system high point. With a first test ball capable of fluid delivery at a first location of a pipe segment and a second test ball which can which has a camera lens anteriorly mounted and anteriorly facing at a second location with the camera lens facing the fluid delivery test ball an optimal apparatus and method of the present invention for testing pipelines for leaks is achieved because a very limited amount of water or test fluid can be delivered to fill the pipeline segment defined by the distance apart of the two inflated test balls which test fluid can be directly viewed by the operator of the remote camera via the video monitor.

Even more effective and efficient is an apparatus combining with the aforementioned cable length measuring device, a group of two or more test balls, each having anterior and posterior ends, either simultaneously or independently inflatable wherein the test balls are tethered to each other by a variably adjustable in length and multipurpose-multifunction service tether which can supply or carry; pressurized air, pressurized water and electricity and camera signals, to any or all test balls and can be used to push or pull the test balls to a location in a pipeline and wherein further the test balls have some or all of the following capabilities or features; they can inflate to seal a pipe internally, they have a camera lens and lighting at both anterior and posterior ends and have fluid delivery capability from either or both anterior and posterior ends and wherein further the test balls are generally located at least three inches apart, but preferably about two feet apart, at one end of the tether called the service end and the other end of the tether called the reel end has the capability of being simultaneously connected to a pressurized water supply, pressurized air supply, electricity for lighting supply and signal cable for the cameras lens to be able to deliver their signals to a viewing terminal and finally wherein the test ball located at the service end of the service tether has a eyelet or other lanyard attaching means for connecting a retrieval lanyard to it. Though more difficult to construct, when this mode of the invention is utilized it is the most efficient and effective apparatus of the invention conceived for effecting the aforementioned pipeline leak location method. The main difference is that instead of viewing the stability of the water level in a completely filled drainage pipe to vary, the water or test fluid in a segment of the pipe may be viewed to vary through the remotely located camera lens, and the test can be repeated with minimal usage and waste of water.

BRIEF DESCRIPTION OF THE DRAWING

The figures referred to below represent several versions of the preferred embodiment.

DETAILED DESCRIPTION

Referring to the drawings in detail, wherein like reference characters designate like parts throughout the various views, there is shown in FIGS. 1 through 8, more than one form of the elements needed to perform a test on a typical sewer drainage system and comprising the components of the apparatus subject of this invention. FIGS. 1,2, 3, and 5 show a typical, though simplified household sewer drainage system with hollow test ball 1 and 1a, remote cameras 4 and 4a, with anterior facing lenses 41 and 41a, pneumatic hoses 2 and 2a, test fluid or water 13, camera housing retrieval lanyards and take up spools 5 and 5a, and camera service cables 6 and 6a, disposed therein. Also shown outside of the pipeline are several other components of the apparatus comprising; take up reels 7 and 7a, for the camera service cables, video monitors 8 and 8a, for viewing inside the pipeline via the cameras and connecting cables, air compressors 3 and 3a, and counters 61 and 62, for determining the length of camera service cable inserted in the pipeline. It is intended that a variety of the various components and attachments to the components may be used but are disclosed here as being provided to allow for on site adaptation of the apparatus to various pipeline configurations. For example FIG. 1, does not show lanyards attached anteriorly to the test balls 1 and 1a however a posteriorly mounted lanyard is attached to both remote cameras 4 and 4a. These components may hereafter be referred to as; camera, cable, reels, monitor, VCR, tractor system, winch or other names which are listed by RS Technical Services incorporated as the following parts numbers and names; 10-1038 Camera Power Supply with Transformer, 10-1400 and 10-1415 Red Eye System and Camera, 10-1210 and 10-1211 and 10-1201 and 10-1301 and 10-1310 and 10-1001 and 10-1425 Cameras, 11-1017 and 11-1019 and 11-1220 and 11-1211 and Push Cable with Reel, 11-1300 Fiberglass Push Rod with Reel, 11-1252 Power Econo Reel with Footage Counter, 31-1007 Push Cable Reel with Slip Rings, 31-1020 Counter, 10-1317 Skids, 32-1000 Tractor Transport Vehicle. These parts are enumerated and disclosed as samples of parts considered herein as disclosed for purposes of assisting in the description of the invention which encompasses these parts but is not limited to these parts. Also samples of test balls disclosed herein but not intended as limiting the scope of this invention to these test balls, they are, Numbers: 270-016, 270-024, 270-032, 270-040, 270-059, 270-67, 275-441, 053-910, 056-103, 271-020, 271-039, 271-047, 271-055, 271-063, 271-098, 74-518, 274-526, and 274-534. Basically these test balls are generally smaller in diameter than the pipe into which they are inserted for testing purposes and they range in size from small enough to test one and one half inch nominal diameter pipe up to six inch nominal diameter pipe and are disclosed as part of this invention, however it is conceived that the size of pipe possible to test and inspect by the herein disclosed apparatus and method may include both smaller and larger diameter pipes and variations on the test balls.

Figures 3, 4:
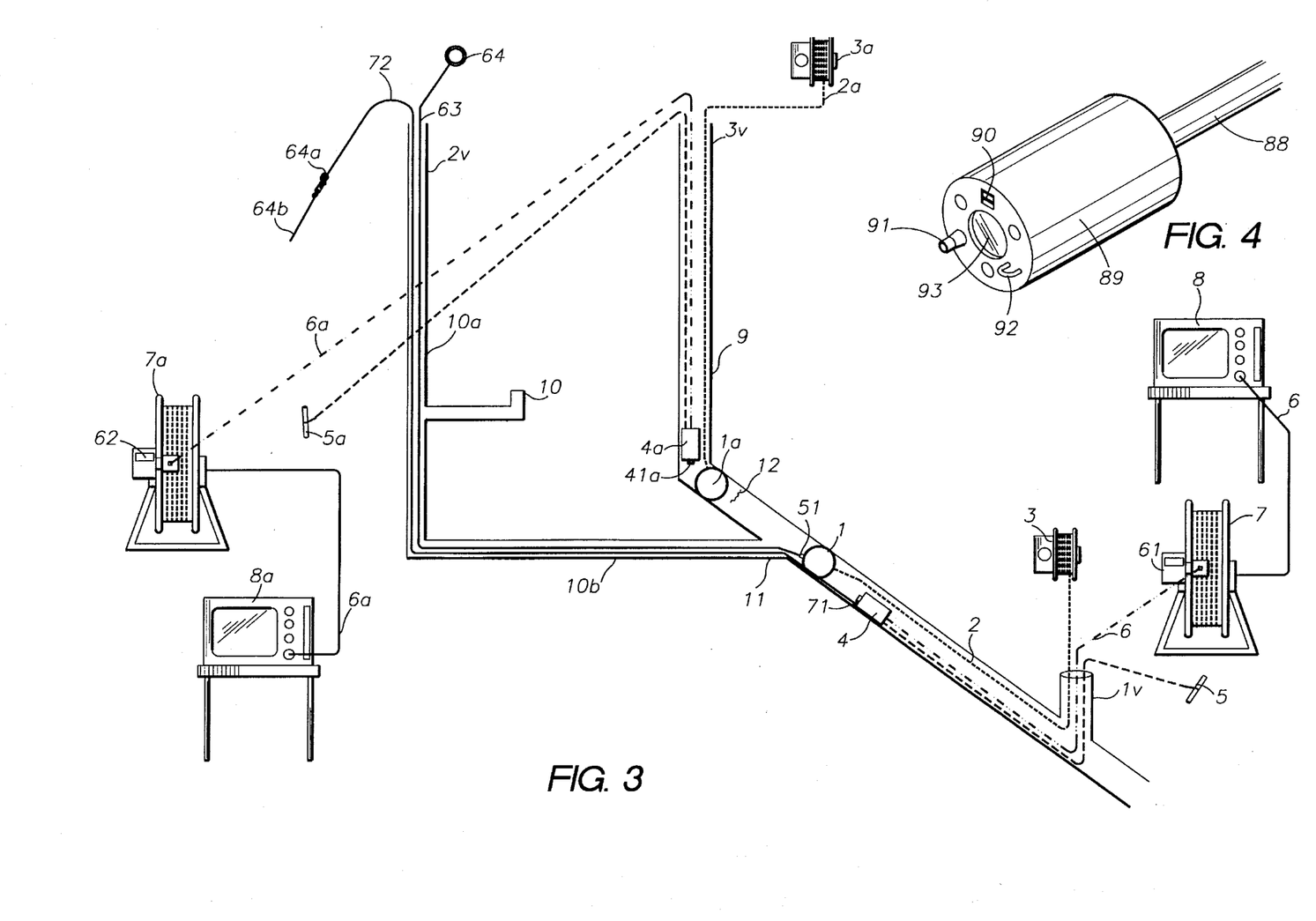
FIG. 3. is a front elevational view of the various components that together form a different version of a pipeline testing and leak locating apparatus.
FIG. 4. is an oblique view of the camera housing.
Figure 5:
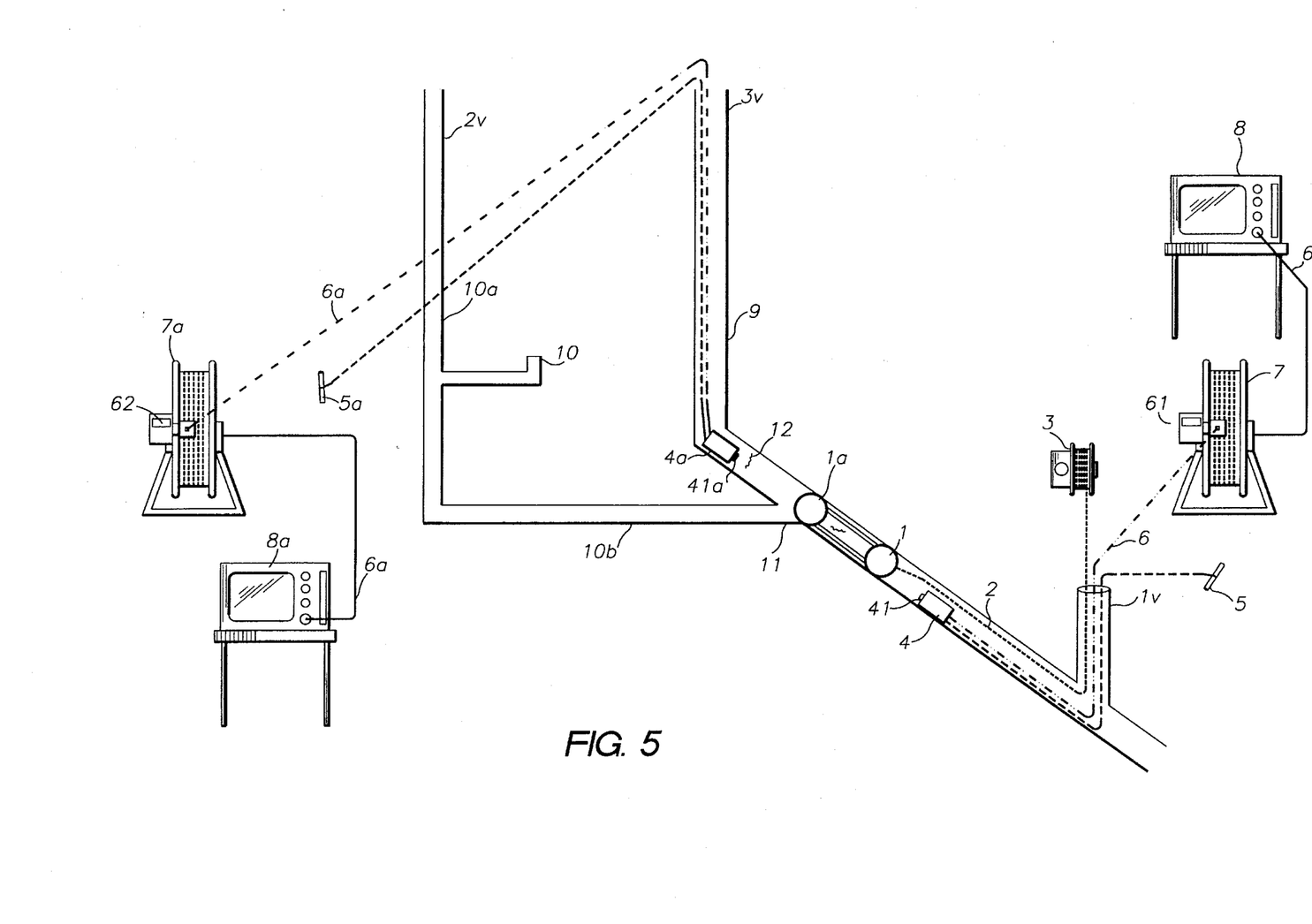
FIG. 5. is a front elevational view of the various components that together form a different version of a pipeline testing and leak locating apparatus.

Referring to FIG. 3, among the several components of the apparatus are; lanyards 72 and 63, which are attached, when needed, to the anterior surfaces 71 and 51 of the camera and test ball respectively for aiding in the guiding and positioning of the components.

Referring to FIG. 4, the remote camera housing is shown with anterior recessed peg 90, anterior dummy or functional camera service cable mounting bolt 91, lanyard mounting hoop 92, and anterior facing camera lens 93. The various mounting means are for attaching cables or lanyards thereto for aiding in the guiding and positioning of the camera. Similar mounting means are also provided on the posterior end of the camera housing. Alternatively a string may simply be tied to the housing or service cable.

Figure 8:
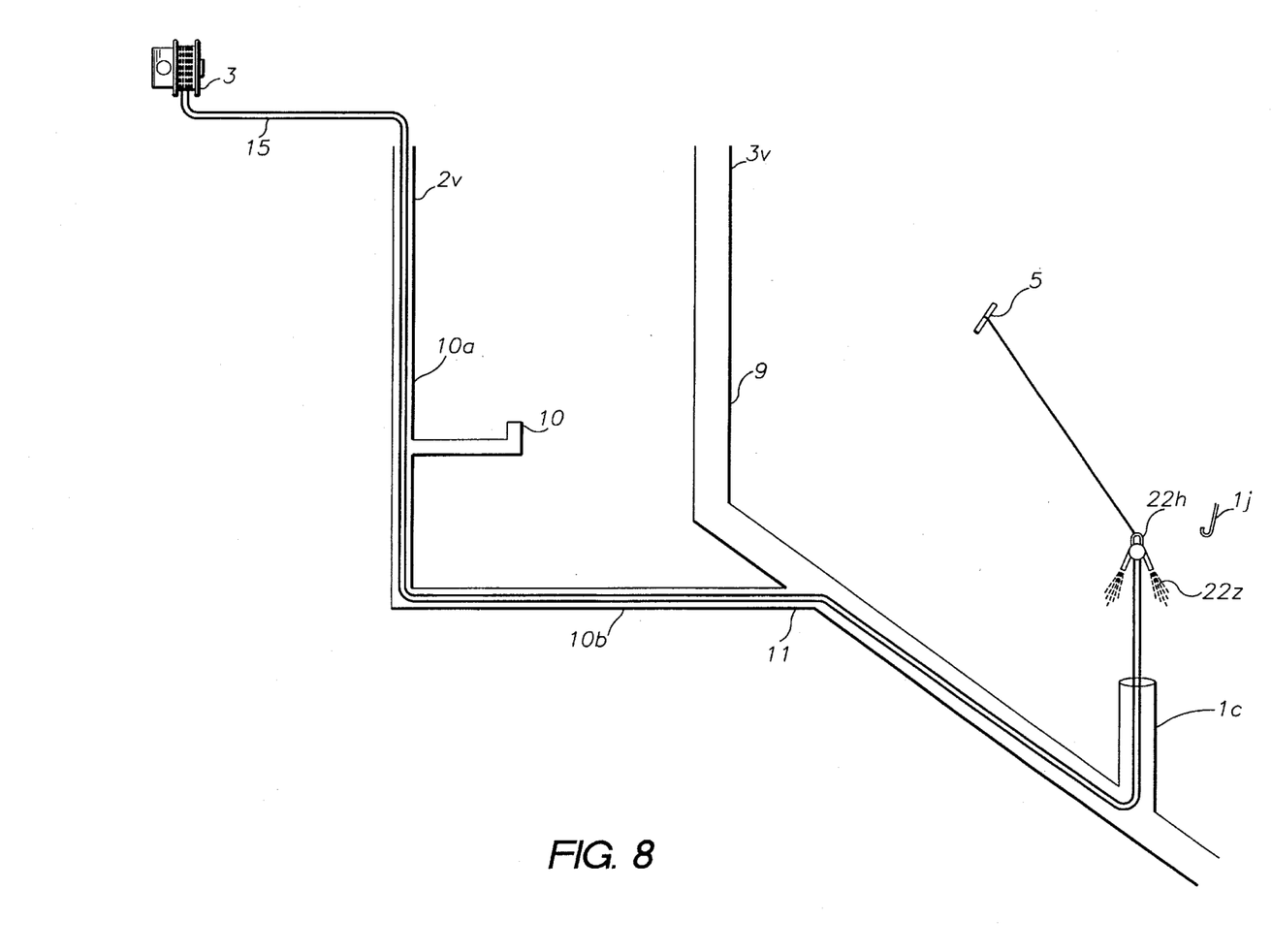
FIG. 8. is a transparent view of the sewer system with the lanyard retrieving hose shown blown through to the clean out.

Referring to FIG. 8, The same transparent sewer system is shown with highly flexible and lightweight lanyard retrieving hose 15, shown disposed therein and blown through to the clean out part 1cc, where it has been fished out by means of a "J" shaped rod 1j. The hose is blown through by virtue of having compressed air supplied to it by compressor 3, and forward propulsion being provided to the hoses forward end by virtue of rearwardly escaping compressed air exiting the rearward facing nozzles 22z, on the hose's forward end. At least one but possibly up to 4 lanyards can be removeably connected thereto. Each lanyard 5, has a reel end and a service end, and the reel end has been tied to the retrieving hose's pipeline penetrating forward end 22h.

Figure 1:
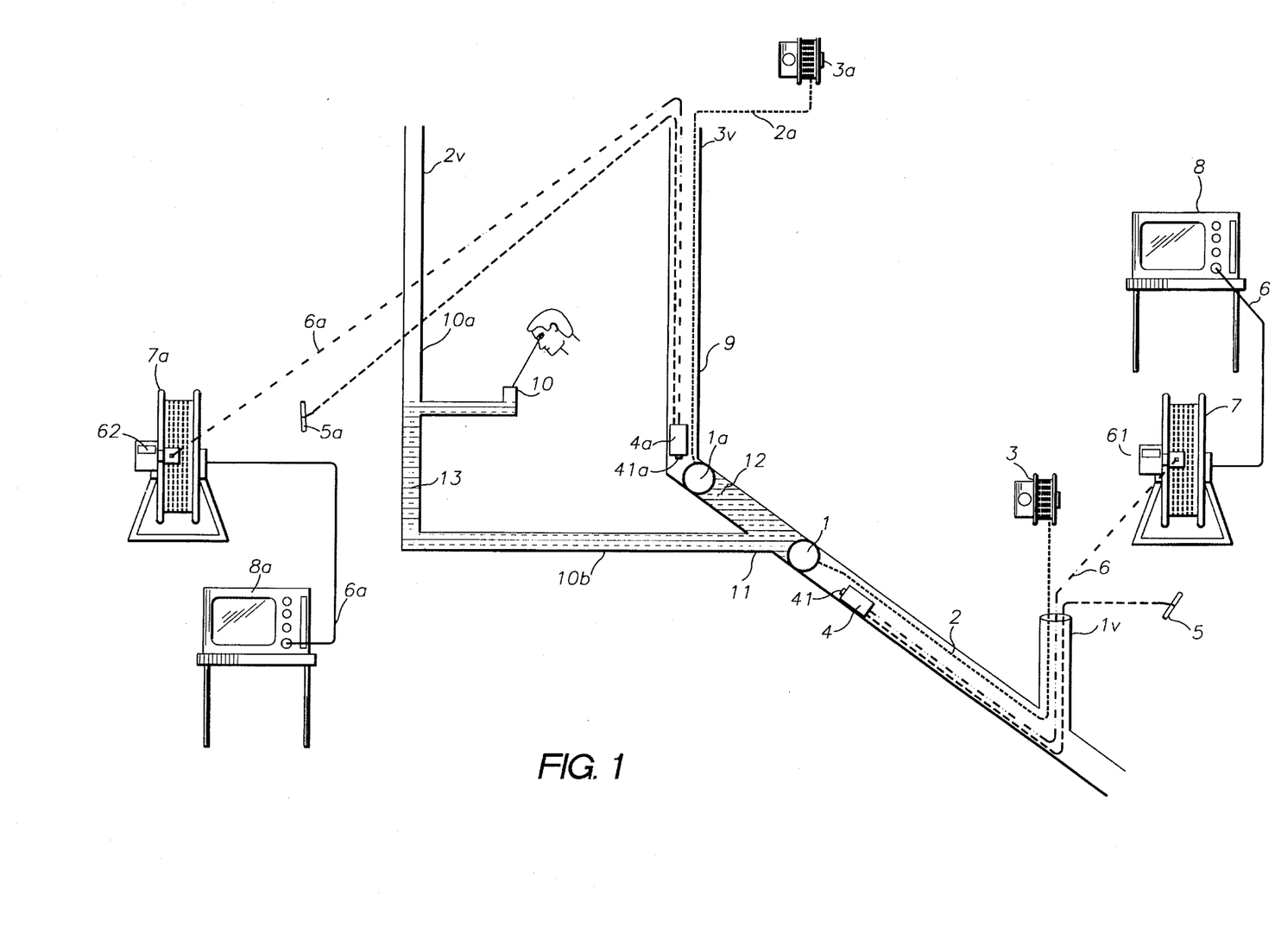
FIG. 1. is a front elevational view of the various components that together form a pipeline testing and leak locating apparatus.
Figure 2:
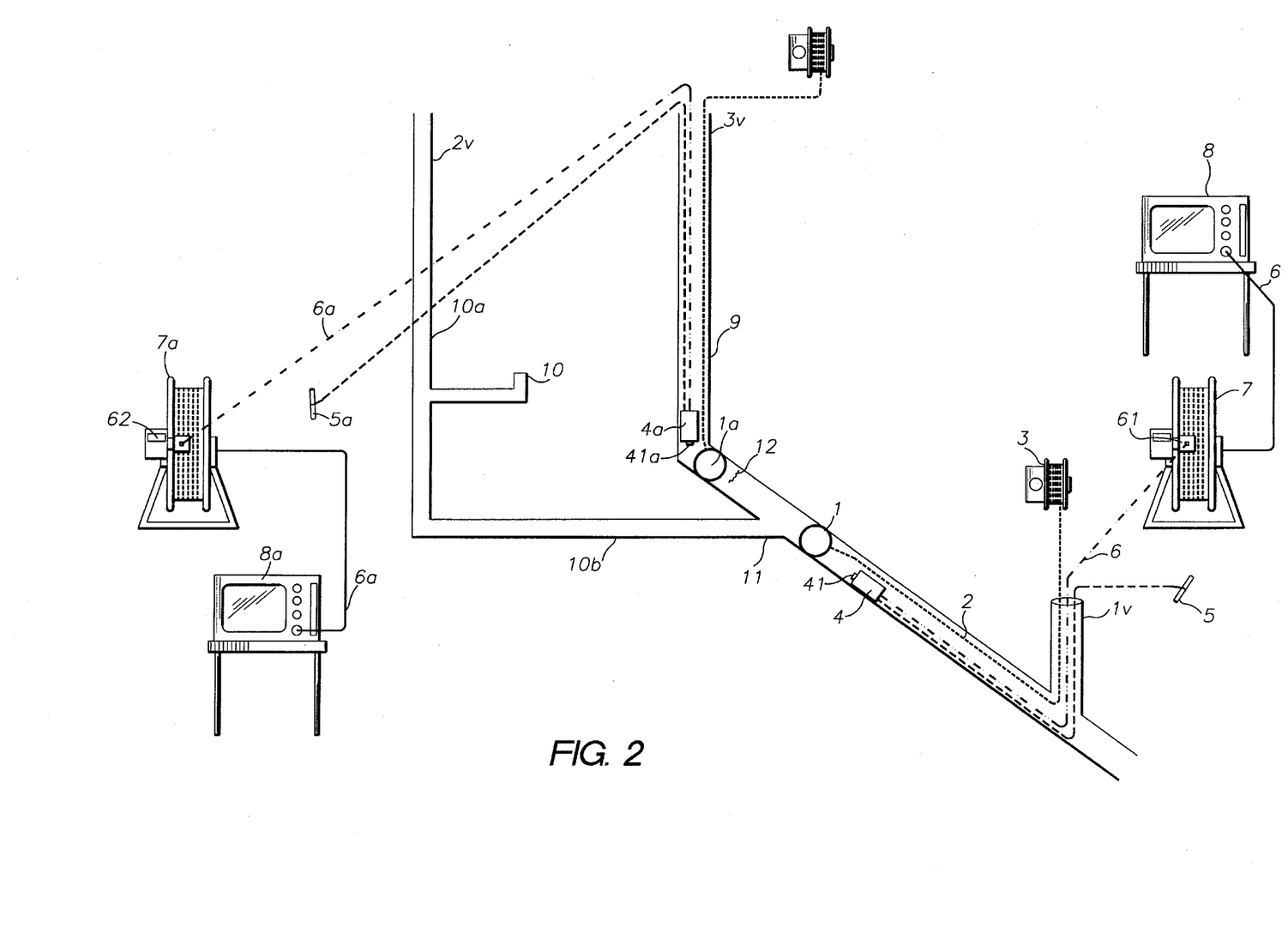
FIG. 2. is also an elevational view with explanations directly placed on the drawing.

Once the lanyard retrieving hose with lanyard attached is pulled back through the pipeline; for example from the access at the clean out 1v as shown in FIG. 1, the lanyard can be used to partially or completely pull through the pipeline, the remote cameras or the test balls. The lanyard has loops and/or spring clasps at both service and reel ends as shown on the reel end of lanyards 72 and 63 at 64 and 64a and 64b as shown in FIG. 3.

Figure 9:
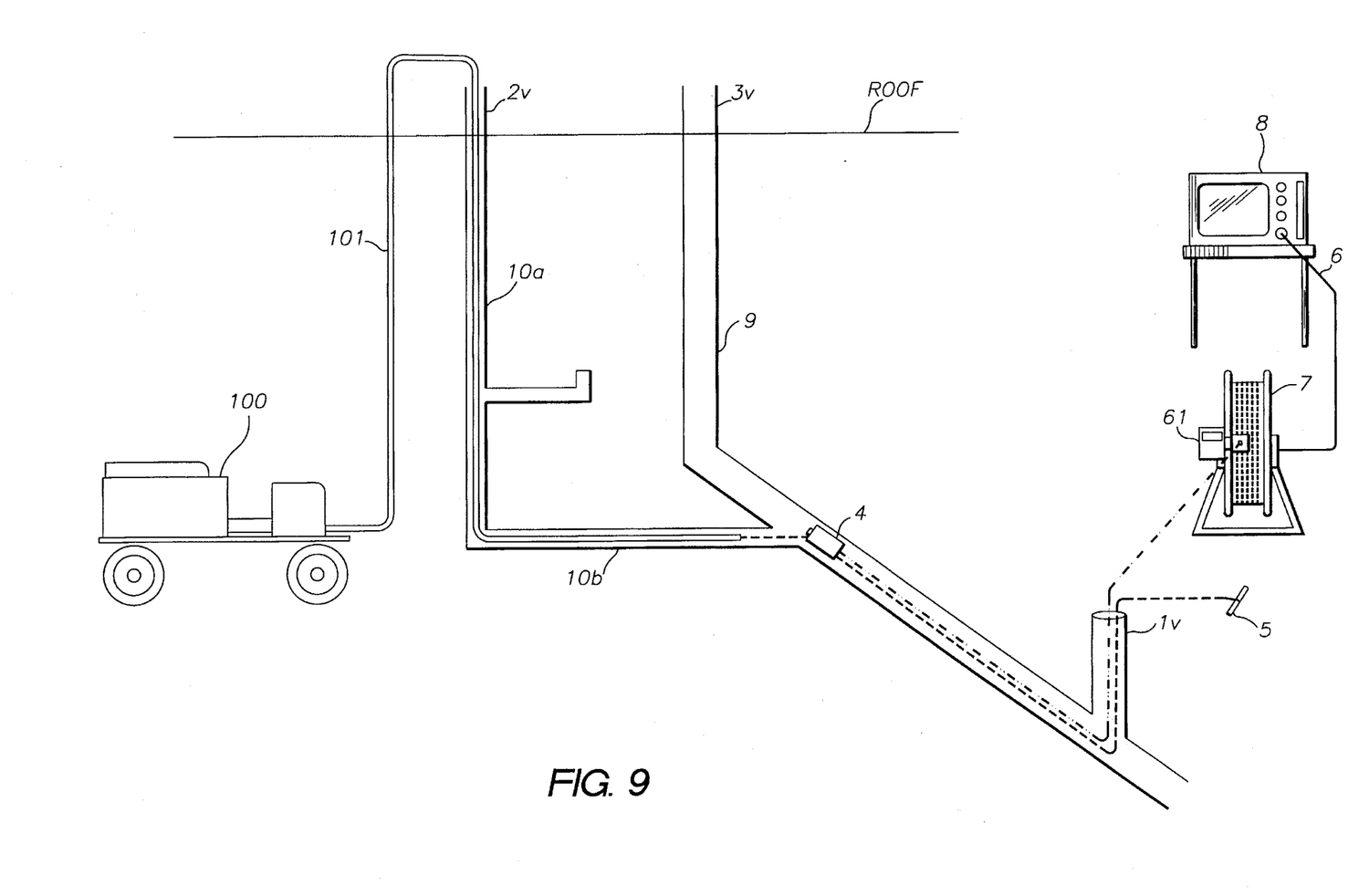
FIG. 9. is a view showing the pressure washer.

Referring to FIG. 9, an additional component of the apparatus is a power washer 100, which is used to clean the interior of the pipeline to be inspected and to propel its high pressure hose 101, which like the lanyard retrieving hose, has a pipeline penetrating forward end to which is tied a string or lanyard. The difference being that by the high pressure power washer means the lanyard can be propelled to a point or service opening in the pipeline rather than retrieved from a point or service opening in the pipeline.

Figure 7:
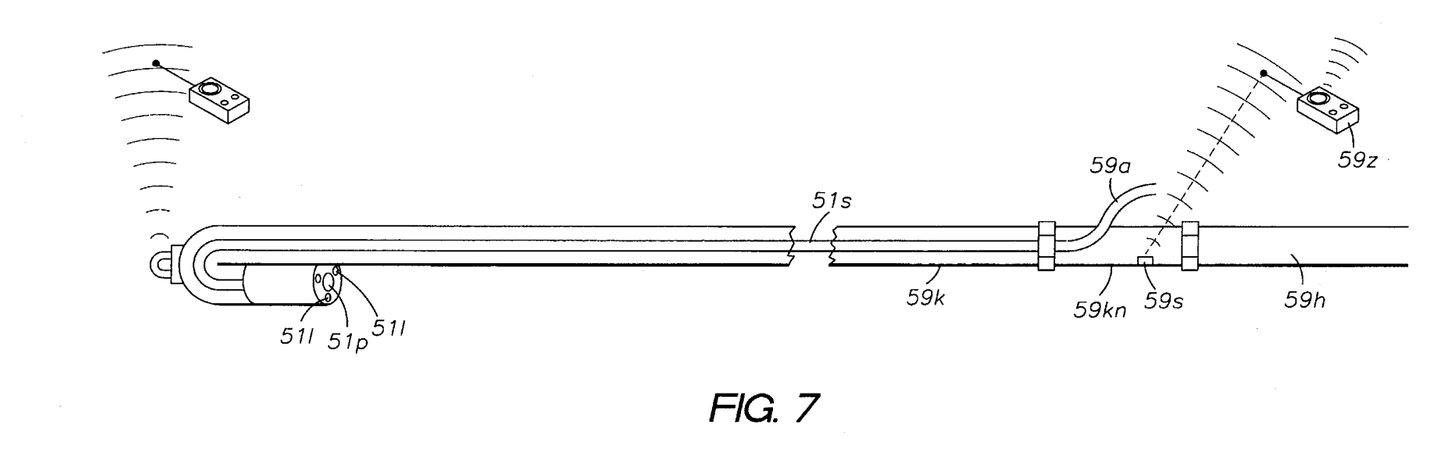
FIG. 7. is a transparent view of an internal part of the a variably adjustable tethered test ball assembly and an external part.

Yet another feature of the apparatus is an audible beacon 59s as shown in FIG. 7, for assisting in locating the position of a test ball or camera that is disposed within the a pipeline being tested. The beacon may be inaudible to human hearing and may be a radio beacon which is picked up on a dedicated radio pick up device 59z as shown in FIG. 7. The beacon 59s may further be remotely operated by radio transmitter 59z to give an audible or inaudible beacon.

Figure 12:
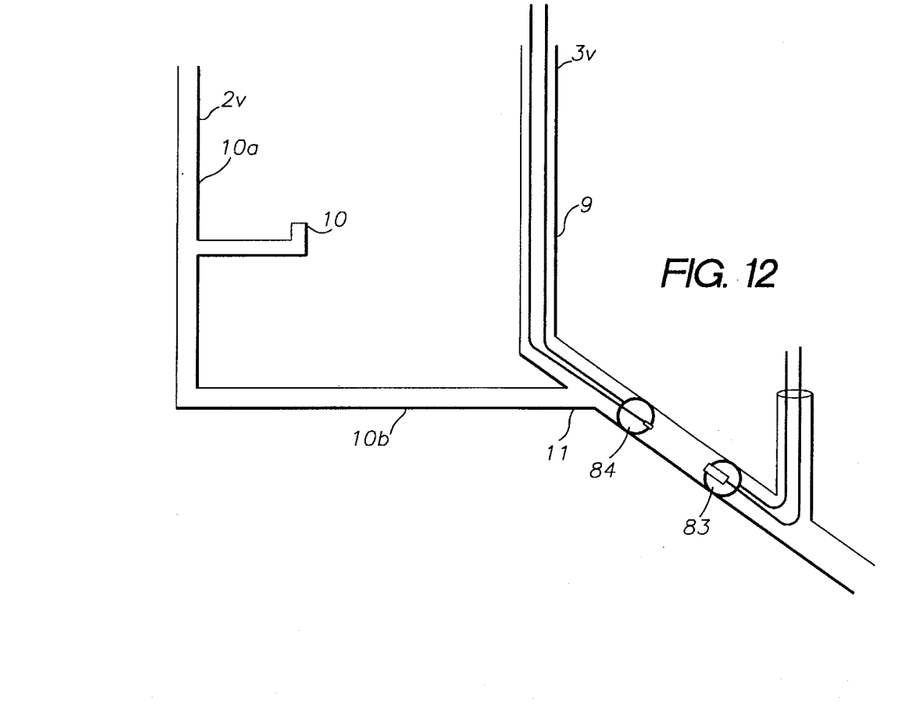
FIG. 12. shows a fluid delivery hose embodied within a test ball.

Another embodiment with a first test ball capable of fluid delivery 84 as shown in FIG. 12 at a first location of a pipe segment and a second test ball which has a camera lens anteriorly mounted within the test ball 83 as shown in FIG. 12, and anteriorly facing at a second location with the camera lens facing and able to view the fluid delivery test ball. A possibly better embodiment of the apparatus and method of the present invention for testing pipelines for leaks is achieved because a limited amount of water or test fluid can be delivered to fill the pipeline segment defined by the distance apart of the two inflated test balls which test fluid lend stability as directly viewed by the operator of the remote camera via the video monitor.

Figure 6:
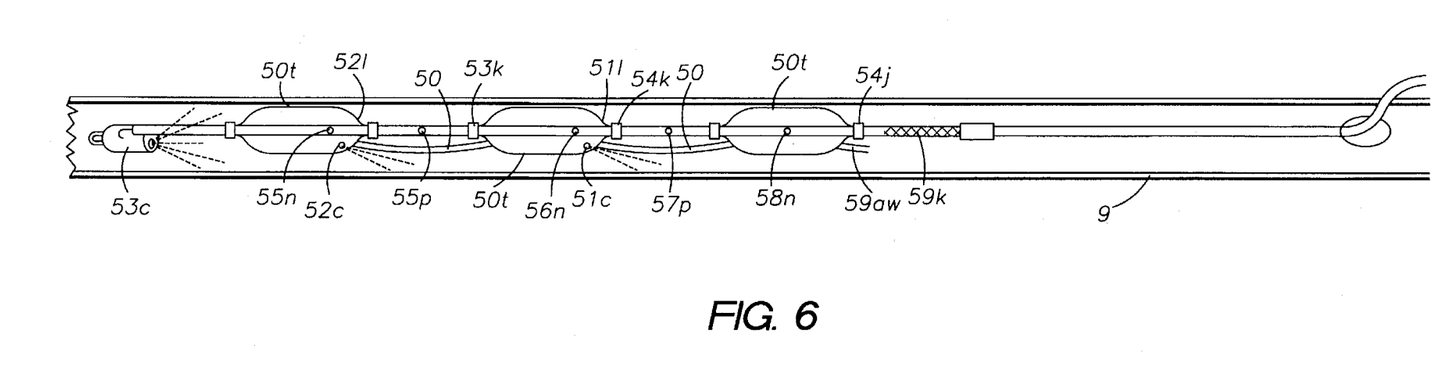
FIG. 6. is a cut away view of a pipeline with an embodiment of one of the components: a variably adjustable tethered test ball assembly, shown in the pipeline.
Figure 11:
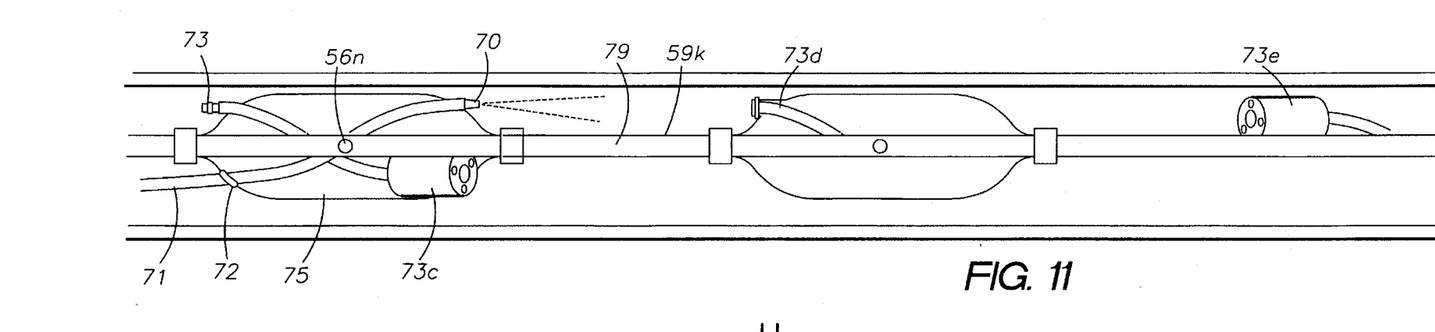
FIG. 11. is a view showing the adjustable tether with moveable test balls.

Even more effective and efficient is an apparatus combining with the aforementioned components, a tether or mother hose having a group of two or more test balls 50t as shown in FIG. 6, each having anterior and posterior ends, and each further being slideably mounted to the mother hose and having a neck formed on the anterior and posterior ends thereof and which have threaded means on the exterior of the necks and which may be secured to the mother hose by a hose clamp or a collet nut which engages said threaded means and by said nut and threaded means being of a complimentarily designed nature so that the nut when tightened on to the neck of said test ball has the effect of compressing the neck of the test ball against the mother hose exterior providing an air tight seal so that air cannot escape from the test ball to the pipe line interior being tested. Each test ball also being either simultaneously or independently inflatable wherein the test balls are tethered to each other by a variably adjustable in length and multipurpose-multifunction service tether 59k as shown in FIGS. 6 and 11, which tether or mother hose, by virtue of internal passageways, such as shown by the camera service cable 59a as shown in FIG. 7, a plurality of such internal hose routing means can supply or carry; pressurized air, pressurized water and electricity and camera signals, to any or all test balls mounted on the mother hose. The mother hose further has these features illustrated at FIG. 6; abrasion resistant exterior coating 59k, soft rubber collars 54j, slideably mounted on the mother hose which are used to seal the test balls against the mother hose when the collet nuts 53k and 54k, are tightened on either end of each test ball, air supply perforation nozzles 55n, 56n, 58n which allow air to exit the mother hose and inflate the test balls in the pipe being tested, fluid delivery nozzles 55p and 57p. The loosening of the collet nuts allows the test balls to slide along the length of the mother hose thereby making them adjustable. The mother hose can be used to push or pull the test balls to a location in a pipeline and wherein further the test balls have some or all of the following capabilities or features; they can inflate to seal a pipe internally, they have a camera lens and lighting 52L and 52c, at either or both anterior and posterior ends and external connections 72 and 73 as shown in FIG. 11, and have fluid delivery capability from either or both anterior and posterior ends. A test ball with such anterior fluid delivery capability is shown at 70 in FIG. 11. and at 84 FIG. 12. It has a one way valve within its internal connecting hose close to the fluid delivery nozzle. The test balls are generally located at least three inches apart on the mother hose, but preferably about two feet apart as long as they can be inflated by being located over an air supply perforation nozzle, the mother hose has the capability of being simultaneously connected to a pressurized water supply, pressurized air supply, electricity for lighting supply and signal cable for the cameras lens to be able to deliver their signals to a viewing terminal and finally wherein the camera 53c as shown in FIG. 6, located at the service end of the mother hose has a eyelet or other lanyard attaching means for connecting a retrieval lanyard to it. Though more difficult to construct, when this embodiment of the invention is utilized it is the most efficient and effective apparatus of the invention conceived for effecting sewer drain pipeline leak location. The main difference is that instead of viewing the stability of the water level in a completely filled drainage pipe to vary, the water or test fluid in a segment of the pipe may be viewed to vary through the remotely located camera lens, and the test can be repeated with minimal usage and waste of water.

By the use of a test ball which has the capability of delivering fluids ahead of the ball 75 FIG. 11, and simultaneously sealing a pipe the aforementioned and described apparatus and method is made even more efficient and effective. This is because less water will be used to test pipeline segments and smaller segments of pipe can be tested with greater accuracy than when a singular test ball is used and which may be at such a distance from the high point that the drainage system expansion and contraction may provide inconsistent or erroneous fluid stability levels when viewed at the system high point.

The method:

This method is described to provide two techniques for testing pipelines, especially but not limited to domestic sewer drainage pipelines for leaks and for locating the leaks with considerable accuracy using the apparatus described above.

Figure 10:
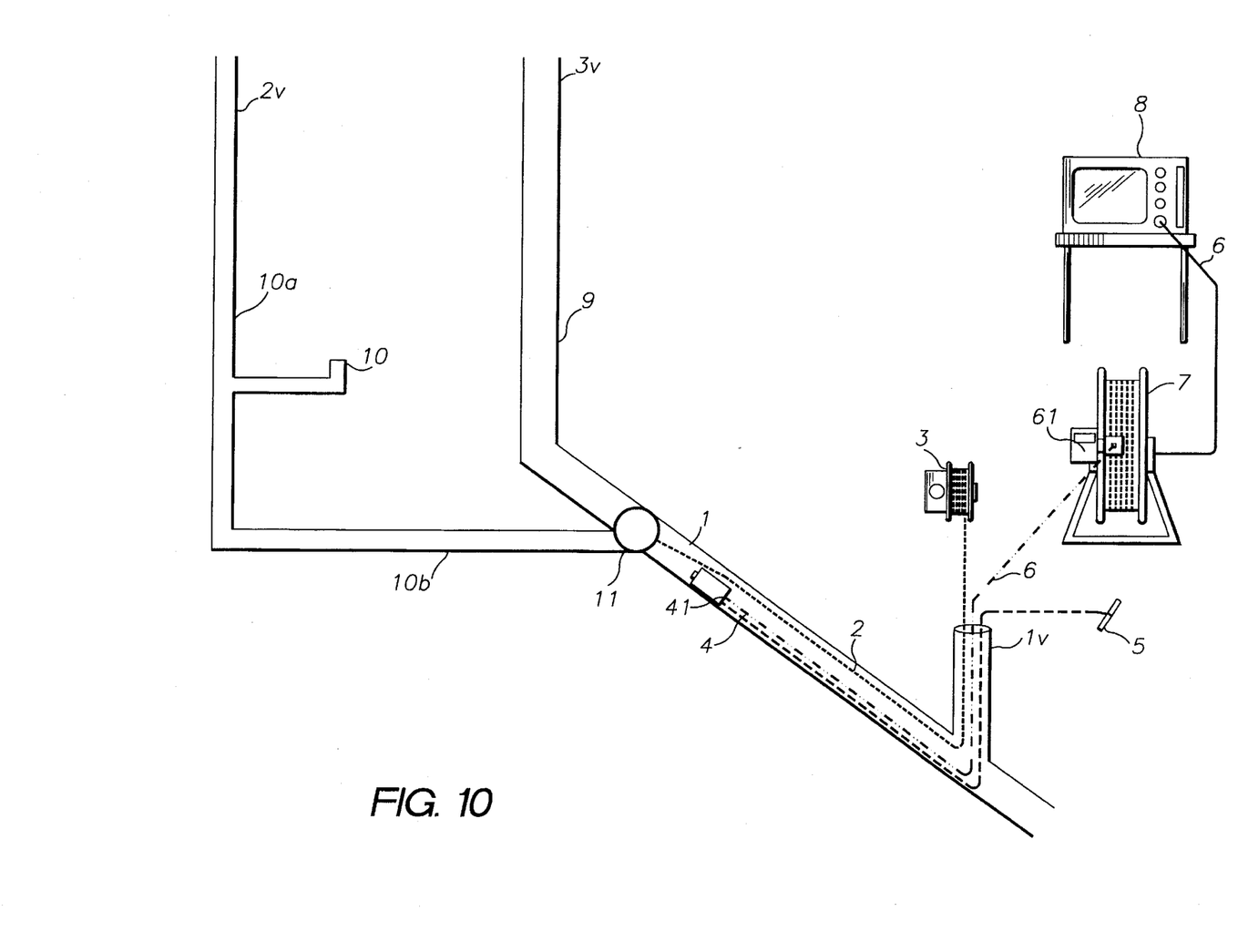
FIG. 10. is a view showing a transparent sewer system and the basic components of the apparatus.

In the case of a suspected vertical pipe drainage leaks; two pipeline access points are located or if necessary cut in to the pipeline, the two points straddling the suspected leak, one preferably a clean out, such as 1v as shown in FIG. 1, provided on the sewer system of nearly all houses and the second perhaps a vent pipe, such as 2v as shown in FIG. 1, which is also found on nearly all houses having internal plumbing. A lanyard is snaked through from the first access point to the second access point. The snaking technique comprises blowing a hose, string or lanyard from a first service opening, of a drainage system to be checked for leaks, to any other or second service opening in the drainage system, which may be anything from a vent pipe on the roof of a single family house system to a manhole of a larger system to an opening made or cut into the sewer pipe at a convenient place by the servicing personnel. Once the hose or lanyard is blown through the pipe segment defined as being between the two service openings, it is attached to the camera lens which is attached to a semi-rigid cable and thus the camera can be pushed and/or pulled to any point between the lanyard supply opening and the camera cable supply opening. This snaking technique is also used for transporting the rubber test ball with its pneumatic or pneumatic/hydraulic service hose attached. Once the camera is in place, the test ball is transported down to an arbitrary point in the pipe, the camera is located beneath the test ball, in a vertical pipe test. The camera is facing or aimed at the test ball and is used to check for the integrity of the test ball seal once it is inflated and the pipe is filled with water or test fluid, and to look for visible defects in the pipe, the test ball is inflated to seal the pipe and the pipe is then filled with water to full capacity from a high point 10 as shown in FIG. 1, in the system which is accessible to be viewed and filled with water. The water level, at the high point is viewed to either remain constant if no leaks are present in the pipe line above the location of the test ball or the water level will recede into the pipe if a leak is present. Thus a segment of pipe is tested for leaks. By relocating the test ball up or down the line and by checking for the adequacy of the test ball seal by the use of the camera and video monitor, a leak's location can be precisely located through the aforementioned process of elimination of good pipe segments, and by the calculated use of the cable and lanyard measuring devices which allow the technician to determine the location of the test balls within the pipeline. In systems with branches and in horizontal pipeline segments more than one test ball and camera can, and sometimes must, be used to isolate a pipe segment. Still by having at least one high point where water levels can be viewed to either remain constant or recede or by using two test balls wherein the camera can be located between the test balls and the water level stability viewed from within the pipe segment defined between the two test balls by the monitor, most domestic and industrial sewer drainage systems may be inexpensively and thoroughly checked for leaks. Although FIG. 1 shows two test balls and generally two apparatuses and FIG. 10 shows only one the inventor considers them both to be show the same method for locating leaks. The method shown in FIG. 1 must be used for horizontal pipelines with the addition of the use of a test ball with test fluid delivery capability.

When because the drainage system being tested is complex by virtue of having a variety of branches and horizontal pipe segments which need to be tested two or more test balls must be used to isolate a segment of pipe. One remote camera is located within the test area. Once the test balls are in place, they are inflated to seal off the pipe segment and water or test fluid is pumped to the segment of pipe being tested through a fluid delivery test ball. With a second camera or plurality of other cameras the quality of all the test ball seals are checked and if necessary test balls are relocated or manipulated by their hoses and lanyards to accomplish a satisfactory seal. Once the seal is satisfactory the video monitor is viewed to see whether the fluid level in the pipe segment being tested remains stable or within parameters defined by the quality of the seals. Should stability not be shown a leak has been located as being within the isolated segment of pipeline and one of the test balls can be advanced towards the other or others and the test repeated. This is repeated until by virtue of the counters and the video read out the test balls are determined to be close enough to have satisfactorily isolated the leak or the leak is visible in the monitors.

When using the preferred embodiment of this apparatus only one mother hose needs to be snaked into the pipeline because the test balls and cameras and fluid delivery means and mother hose can test pipe segments whether they are vertical or horizontal.

The mother hose can be configured in a fixed configuration with no adjustability or can be made adjustable to allow for field modification and make up.

The invention claimed is:

1. A method of locating leaks in vertical drainage plumbing pipelines comprising the steps of;

(a) locating at least two access holes, being hereafter designated access hole one, which may be a clean out and access hole two, which may be a vent pipe, in a sewer drainage pipe, hereafter pipeline, which pipeline consists of an interior wall and an exterior surface and opposite ends "A" and "B" and which is to be tested for leaks and which leaks are to be precisely located to within from about one inch to six inch accuracy, said access holes are preferably at extreme opposite ends of said drainage pipe to be tested, but which may be access holes cut into the wall of said pipeline between points "A" and "B", into which may be inserted one or more of any combination of; a test ball and attached hose, a remote camera housing and attached camera service cable and/or a lanyard which is used to aid in the direction and retrieval of said camera and said test ball;

(b) beginning at access hole two, blowing a lanyard-retrieving extra-flexible hose comprising a first pipeline penetrating forward end and a second water or air supply static end and a rearward facing jet nozzle mounted on said forward end and a lanyard mounting means such as an eyelet or spring clip, through a sewer drainage pipeline hereafter pipeline, by supplying said hose with pressurized air or water through said hose's static end, said hose is propelled through the pipeline in which it is inserted by virtue of the forward propulsion provided by the escaping water or air through said rearward facing nozzle, whereby said hose is thusly propelled completely through a pipeline to at least the point of access hole two, thus providing means for threading one or several lanyards each having a reel end and a service end, through a pipeline or pipeline segment by attaching said lanyard's reel end to said hose's lanyard attaching means and pulling said hose back out of said pipeline and retrieving said lanyard or lanyards thereby, and leaving said lanyard's service end protruding from said pipelines access hole one;

(c) attaching one said lanyard service end to said camera housing anterior end and which housing's posterior end is operateably attached to a camera service/signal and power supply cable, hereafter camera service cable, by means such as a spring clip, a camera service cable dummy coupling or a loop, or serial combination thereof, formed on said lanyard reel and service ends and;

(d) pulling the reel end of said lanyard and thereby inserting at least one remote camera, which is housed in a housing which has an anterior end and a posterior end, said housing contains lights facing anteriorly and is tubularly shaped and has a camera lens also facing anteriorly and has connected posteriorly thereto a semi-rigid camera service cable, hereafter, cable, having first and second ends, said cable attached on said first end to the camera housing's posterior end which supplies power for the lights and signal path for a visual signal from the lens to be conducted to a viewing terminal, (T.V. monitor screen) which is attached to said cable's second end, said cable's semi-rigidness further provides, limited means for inserting said camera lights and housing into said pipeline, via access hole one and aiming generally in the direction of the flow route to access hole two, and controlling the attitude or aim of the remote camera lens, said remote camera also has on its anterior surface a means such as an eyelet or recessed peg, eccentrically located, whereon the attached lanyard thereto and with the combination of said semi-rigid camera cable and said lanyard attached to said camera housing manipulating said cable and lanyard to position said camera lens anterior of or beneath said rubber test ball with said lens aiming at said test ball;

(e) attaching another said lanyard reel end to said test ball which has anterior or posterior ends by means such as a spring clip, or pneumatic hose coupling or camera access cable dummy coupling or a loop formed on said lanyard end;

(f) connecting said test ball's posterior end to a pneumatic hose, which allows the test ball to be inflated thereby and which hose has first and second ends and is connected on said first end to a supply of pneumatic air, pulling on said lanyard's service end thereby inserting at least one inflatable test ball into said pipeline, via access hole two, said test ball which has anterior and posterior ends, and said lanyard's reel end is connected to said test ball's anterior end and the test ball is inserted via access hole two in said pipeline, wherein when said test ball is manipulated, by virtue of the retrieval lanyard and pneumatic hose to a point in a pipeline which, said test ball is inflated to produce a temporary passageway seal or blockage in said pipeline by virtue of said test ball's exterior surface coming in contact with said pipelines interior wall and by virtue of its ball shape;

(g) attaching a mechanism for measuring the amount of cable or lanyard that has passed into or out of a pipeline wherein said mechanism has a numerical display which can be directly read;

(h) inflating said test ball to produce a seal or blockage in the pipeline being tested;

(h) filling the vertical pipe being tested with test fluid or water and by viewing the monitor checking to see whether the test ball has effectively sealed off the pipe from the test fluid or water column above the test ball;

(i) repositioning the test ball or manipulating it to produce a satisfactory seal if required;

(j) viewing the column of water via the access hole two into which the water or test fluid was pumped into the pipe being tested for stability;

(k) determine that the pipeline segment thus tested is leak free if stability of the water level is positive or leaking if the water level recedes into the pipeline;

(l) repositioning the camera and the test ball to check further down the pipeline if the prior step indicated no leakage, or further up the pipeline if the prior step indicated leakage;

(m) continuing to narrow the search for the leak by eliminating sections of non-leaking pipe segments by the technique described above.

2. A PIPELINE leak locating and TESTING APPARATUS comprising:

(a) at least one pipeline inflatable test ball made of any of the following or similar materials; rubber or canvas or rubber impregnated canvas further comprising an interior and an exterior surface and being at least one fourth inch in diameter and one inch long when not inflated and having an anterior and a posterior end which posterior end is connected to a pneumatic hose which has first and second ends and is connected on said first end to a supply of pneumatic air, and wherein the second end of the pneumatic hose is connected to the posterior end of the test ball, wherein when said test ball is inserted to a point in a pipeline which consists of an interior wall and an exterior surface, said test ball may be inflated to produce a temporary passageway seal or blockage in a pipeline by virtue of said test ball's exterior surface coming in contact with said pipelines interior wall and by virtue of its ball shape;

(b) at least one remote camera lens, each housed in a housing which has an anterior end and a posterior end, said housing contains lights facing anteriorly and is tubularly shaped and has a lens also facing anteriorly and has means for connecting posteriorly thereto a semi-rigid camera service cable, hereafter, cable, having first and second ends, said cable attached on said first end to the camera housing's posterior end which supplies power for the lights and signal path for the visual signal to be conducted to a viewing terminal, (T.V. monitor screen) which is attached to said cables second end, said cable's semi-rigidness further comprises means for inserting said camera lights and housing into a pipeline and means for controlling the attitude of the remote camera lens, said remote camera also has on its anterior and posterior surfaces means such as an eyelet or recessed peg, eccentrically located, for attaching a lanyard thereto;

(c) at least one mechanism for measuring the amount of cable or lanyard that has passed into or out of a pipeline wherein said mechanism has a numerical display which can be directly read;

(d) at least one lanyard having a reel end and a service end and means for attaching said lanyard service end to either said camera housing or said test ball anterior or posterior ends such as a spring clip, or pneumatic hose coupling or loop formed on said lanyard end, said lanyard further being made of any one or combination of the following, monofilament plastic, braided nylon string, cotton string plastic string, braided string braided cotton or plastic rope, metal or plastic ball chain, metal link chain, plastic coated cords, plastic coated string, fibre flat strap, flattened plastic cord, plastic chain or flexible hose;

(e) at least one lanyard-retrieving hose comprising a first pipeline penetrating forward end and a second water or air supply static end and a rearward facing jet nozzle mounted on said forward end and a lanyard mounting means such as an eyelet or spring clip, whereby when said hose is supplied with pressurized air or water said hose will be propelled through a pipeline in which it may be inserted by virtue of the forward propulsion provided by the escaping water or air through said rearward facing nozzle, whereby said hose may be thusly propelled completely through a pipeline thus providing means for threading a lanyard through a pipeline or pipeline segment by attaching said lanyard to said hose lanyard attaching means and pulling said lanyard-retrieving hose back out of said pipeline;

(f) a protective sleeve on said lanyard, said pneumatic hose and said semi rigid camera service cable for adding durability thereto consisting of any one or a combination of the following elements, plastic, rubber, steel braid, fiber-glass, fiber-glass braid, metal alloy braid;

(g) wherein said test balls further comprise a device with means for signalling by an audible beacon or an inaudible radio beacon and said apparatus further comprises a receiving radio or a remotely activated audible beacon or inaudible radio beacon.

3. A PIPELINE leak locating and TESTING APPARATUS comprising:

(a) at least one pipeline inflatable test ball made of any of the following or similar materials; rubber or canvas or rubber impregnated canvas further comprising an interior and an exterior surface and being at least one fourth inch in diameter and one inch long when not inflated and having an anterior and a posterior end which posterior end is connected to a pneumatic hose which has first and second ends and is connected on said first end to a supply of pneumatic air, and wherein the second end of the pneumatic hose is connected to the posterior end of the test ball, wherein when said test ball is inserted to a point in a pipeline which consists of an interior wall and an exterior surface, said test ball may be inflated to produce a temporary passageway seal or blockage in a pipeline by virtue of said test ball's exterior surface coming in contact with said pipelines interior wall and by virtue of its ball shape;

(b) at least one remote camera lens, each housed in a housing which has an anterior end and a posterior end, said housing contains lights facing anteriorly and is tubularly shaped and has a lens also facing anteriorly and has means for connecting posteriorly thereto a semi-rigid camera service cable, hereafter, cable, having first and second ends, said cable attached on said first end to the camera housing's posterior end which supplies power for the lights and signal path for the visual signal to be conducted to a viewing terminal, (T.V. monitor screen) which is attached to said cables second end said cable's semi-rigidness further comprises means for inserting said camera lights and housing into a pipeline and means for controlling the attitude of the remote camera lens, said remote camera also has on its anterior and posterior surfaces means such as an eyelet or recessed peg, eccentrically located, for attaching a lanyard thereto;

(c) at least one mechanism for measuring the amount of cable or lanyard that has passed into or out of a pipeline wherein said mechanism has a numerical display which can be directly read;

(d) at least one lanyard having a reel end and a service end and means for attaching said lanyard service end to either said camera housing or said test ball anterior or posterior ends such as a spring clip, or pneumatic hose coupling or loop formed on said lanyard end, said lanyard further being made of any one or combination of the following, monofilament plastic, braided nylon string, cotton string plastic string, braided string, braided cotton or plastic rope, metal or plastic ball chain, metal link chain, plastic coated cords, plastic coated string, fibre flat strap, flattened plastic cord, plastic chain or flexible hose;

(e) at least one lanyard-retrieving hose comprising a first pipeline penetrating forward end and a second water or air supply static end and a rearward facing jet nozzle mounted on said forward end and a lanyard mounting means such as an eyelet or spring clip, whereby when said hose is supplied with pressurized air or water said hose will be propelled through a pipeline in which it may be inserted by virtue of the forward propulsion provided by the escaping water or air through said rearward facing nozzle, whereby said hose may be thusly propelled completely through a pipeline thus providing means for threading a lanyard through a pipeline or pipeline segment by attaching said lanyard to said hose lanyard attaching means and pulling said lanyard-retrieving hose back out of said pipeline, wherein the apparatus further comprises a tank or other supply of water or test fluid in quantities sufficient for effecting complete tests on a variety of single family house sewer systems;

(f) a protective sleeve on said lanyard, said pneumatic hose and said semi rigid camera service cable for adding durability thereto consisting of any one or a combination of the following elements, plastic, rubber, steel braid, fiber-glass, fiber-glass braid, metal alloy braid.

4. The PIPELINE leak locating and TESTING APPARATUS of claim 3 wherein the test fluid comprises a suspension of either a fluorescent or phosphorescent material in a transparent liquid wherein detection of leaks around test ball seals is enhanced by the increased visibility of said test fluid when said camera lights shine on said test fluid or when said camera lights do not work.

5. A PIPELINE leak locating and TESTING APPARATUS as in claims 2, 3, or 4 further comprising a high pressure washer and hose having a forward pipe penetrating end attached thereto for cleaning and snaking of lanyard wherein when used for snaking it has a rearward facing nozzle on the forward end which propels the hose through the pipeline when high pressure water is supplied to the hose and the nozzle or forward end of the hose has a lanyard mounting means such as a peg or loop.

6. A PIPELINE leak locating and TESTING method as in claim 1 wherein several cameras and test balls are used to effect a test method similar to that of the test generally described in claim two wherein the system is a multi-segmented pipeline with different diameter pipesections, and different branch directions due to the presence of "Y" or "T" joints and requires several test balls to isolate the different segments of pipeline to test.

7. The same method as in claim 1 wherein when used on a horizontal pipe, at least first and second test balls are used wherein further said firs test ball comprises the test ball and an anteriorly facing water or test fluid delivery means such as a hose mounted from the posterior of said test ball through the hollow interior and through to the anterior surface of said test ball and said second test ball comprises a remote camera mounted to its anterior surface wherein when said test balls are positioned in a horizontal pipeline and they are inflated the camera will provide a view of the stability of water or test fluid in the pipeline that may be pumped through the hose into the space between the blockages provided by the two inflated test balls.

8. The same method as in claim 5 wherein a variety of test balls are used to effect the test generally described therein in a complex or multidirectional and multi sized pipeline system.

9. A PIPELINE leak locating and TESTING APPARATUS as in claims 3, or 4, wherein the lanyards comprise a quality, such as by being flat as ribbon or thin string, which will compress against a pipeline wall being tested and not cause significant leakage when said lanyard is disposed adjacent a test ball that is inflated to effect a blockage in a pipeline being tested.

10. A PIPELINE leak locating and TESTING APPARATUS as in claims 2, 3, or 4 further comprising wherein test balls are tethered to each other by a variably adjustable in length and multipurpose-multi-function service tether, which tether or mother hose, by virtue of internal passageways, a plurality of such internal hose routing means can supply or carry; pressurized air, pressurized water and electricity and camera signals, to any or all test balls mounted on the mother hose said mother hose further has; abrasion resistant exterior coating, soft rubber collars slideably mounted on the mother hose which are used to seal the test balls against the mother hose when the collet nuts are tightened on either end of each test ball, air supply perforation nozzles which allow air to exit the mother hose and inflate the test balls in the pipe being tested, fluid delivery nozzles wherein loosening of the collet nuts allows the test balls to slide along the length of the mother hose thereby making them adjustable said mother hose can be used to push or pull the test balls to a location in a pipeline and wherein further the test balls have some or all of the following capabilities or features; they can inflate to seal a pipe internally, they have a camera lens and lighting at either or both anterior and posterior ends and external connections and have fluid delivery capability from either or both anterior and posterior ends wherein further said water or fluid delivery means has a one way valve within its internal connecting hose close to the fluid delivery nozzle and wherein further said test balls are generally located at least three inches apart on the mother hose, but preferably about two feet apart as long as they can be inflated by being located over an air supply perforation nozzle, the mother hose has the capability of being simultaneously connected to a pressurized water supply, pressurized air supply, electricity for lighting supply and signal cable for the cameras lens to be able to deliver their signals to a viewing terminal and finally wherein the camera located at the service end of the mother hose has a eyelet or other lanyard attaching means for connecting a retrieval lanyard to it.

* * * * *